Figure 1:
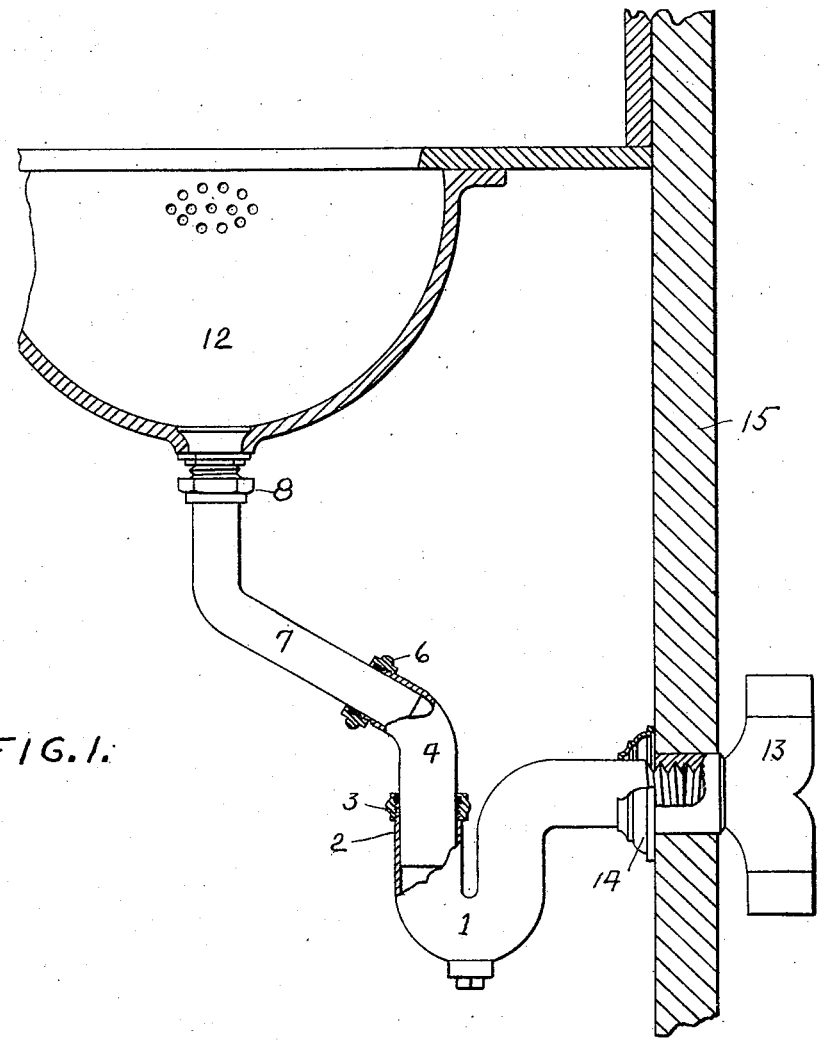

(No Model.) 2 Sheets—Sheet 1.

C. H. MOORE.
TRAP FIXTURE FOR WASHBASINS.

No. 595,577. Patented Dec. 14, 1897.

WITNESSES:
F. W. Wright
S. C. Connor

INVENTOR
Charles H. Moore
BY
Howson and Howson
ATTORNEYS

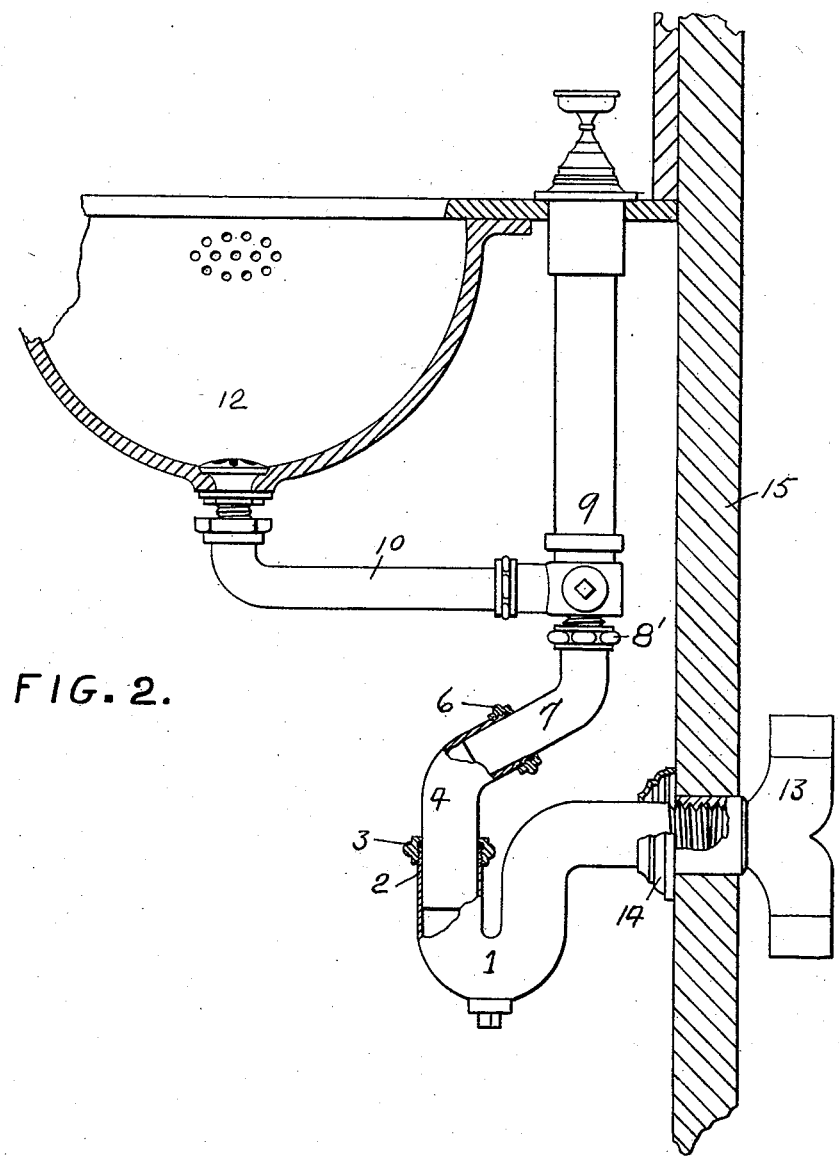

UNITED STATES PATENT OFFICE.

CHARLES H. MOORE, OF NEW YORK, N. Y.

TRAP-FIXTURE FOR WASHBASINS.

SPECIFICATION forming part of Letters Patent No. 595,577, dated December 14, 1897.

Application filed December 26, 1896. Serial No. 617,050. (No model.)

*To all whom it may concern:*

Be it known that I, CHARLES H. MOORE, a citizen of the United States of America, and a resident of New York city, New York, have invented an Improved Trap-Fixture for Washbasins, &c., of which the following is a specification.

My invention relates to fixtures for washbasins, sinks, &c.; and it consists of an improvement upon the invention for which I obtained Letters Patent No. 559,188, dated April 26, 1896.

The main object of my present improvement is to construct the waste trap-fixture so that it may be adjusted in any direction on the inlet side and be there connected as desired without having to adjust or in any way alter the connection of the discharge end of the trap.

In the accompanying drawings, Figure 1 is a side view of my invention with some of the parts shown in section; and Fig. 2 is a similar view, but showing the inlet side of the trap-fixture differently connected.

It is important, if not requisite, in modern sanitary plumbing (often to comply with local ordinances) to provide a fixed connection where the discharge end of the trap connects to the waste-pipe by means of a screw pipe-joint, calked lead joint, or solder joint. This lack of adjustability on the outlet side of the trap limits to some extent the capacity for adjustment of the trap of my above-mentioned patent. To meet this and to otherwise increase the adjustability of the trap-fixture, I construct the trap-fixture with a double-curved inlet end divided into two sections and connected to the water-retaining section in such a manner as to admit of the inlet end of the trap being adjusted in a longitudinal or lateral direction, as the case may require, without altering the position of the water-retaining section.

Referring to the drawings, 1 is the U-shaped water-retaining section of the trap, having its discharge end, which in this case is shown as horizontal, connected by a rigid joint to the waste-fitting 13, which passes through the slab 15. This waste-fitting may be of any suitable construction or shape. In the present instance I have shown the joint of the discharge end of the trap with the waste-fitting as a screw pipe-joint, and this may be hidden by a suitable ornamental plate or escutcheon 14.

The inlet side 2 of the water-section 1 of the trap is vertical and adapted to receive the lower straight portion of the curved upper section 4, allowing vertical adjustment of that section 4 in the U part of the trap. The inlet end of this section 4 is adapted to receive the straight lower end of the curved section 7, allowing of an adjustment of section 7 longitudinally in the upper part of the upper section 4. A coupling-nut 3, with a gasket, completes and tightens the joint between the section 4 and the part 2 of the trap 1, while a coupling-nut 6, with gasket, completes and tightens the joint between the section 7 and the section 4. These curved sections 4 and 7, which thus comprise the double-curved inlet of the trap-fixture, may vary in shape and degree of curvature, and in like manner the water-retaining section 1 may vary in shape, without departing from my invention, provided the two curved sections 4 and 7 can be rotated in a lateral direction in the end 2 of the section 1 and the inlet parts can be elongated or shortened longitudinally or in the direction of their length by manipulating the curved sections and without disturbing the water-retaining section, as will be readily understood from the foregoing description in connection with the two figures of the drawings.

In Fig. 1 I have shown the described trap-fixture as connected to the basin 12 by means of a coupling-nut 8. My described fixture when sent out is provided with a section 7, having its lower straight part of sufficient length for this purpose. If, however, it is desired to have the fixture differently connected—as, for instance, in the manner illustrated in Fig. 2—the straight part of the section 7 may be cut short and its upper end connected by a coupling 8' to the basin-waste 9 and connecting tube 10.

With the described construction of trap-fixture it will be seen that notwithstanding the rigid connection of the discharge end of the water-section with the waste-pipe there is capacity for adjustment in all directions on the inlet side, which will allow not only of considerable latitude in placing the basin in relation to the waste-pipe, but also will allow of connection of the trap with radically-different styles of basin-fixtures.

I claim as my invention—

1. A waste-water trap having on its inlet side two curved upper sections adjustable upon each other in the direction of their length and the lower section being adjustable rotarily and in the direction of its length in the water-section of the trap and coupling-nuts to complete the connection, substantially as described.

2. A waste-water trap having on its inlet side two curved upper sections adjustable upon each other rotarily and in the direction of their length, and the lower section being adjustable rotarily and in the direction of its length in the water-section of the trap and coupling-nuts to complete the connection, substantially as described.

In testimony whereof I have signed my name to this specification in the presence of two subscribing witnesses.

CHARLES H. MOORE.

Witnesses:
W. R. BRACKEN,
P. HUGHES.